United States Patent Office 3,471,464
Patented Oct. 7, 1969

3,471,464
INSULIN DERIVATIVES
Paul Bellet, Paris, Truong van Thuong, Clichy-sous-Bois, Gerard Nomine, Noisy-le-Sec, France, assignors to Roussel-UCLAF, Paris, France, a corporation of France
No Drawing. Filed Sept. 30, 1966, Ser. No. 583,440
Claims priority, application France, Oct. 5, 1965, 33,781
Int. Cl. C07g 7/00; A61k 17/04
U.S. Cl. 260—112.7                                   2 Claims

ABSTRACT OF THE DISCLOSURE

This invention relates to novel polypeptides derived from insulin or from one of its direct derivatives such as the N-acyl derivatives, characterized in that the polypeptides contain the basic insulin configuration and at least 65% of the guanidyl groups of the arginine units are blocked in the form of a combination with a dicarbonyl compound such as a β-dicarbonyl compound and, in addition contain between 0 and 2.5 molecules per molecule of insulin polypeptide of a dicarbonyl derivative, which can be released by weak acid hydrolysis. The novel polypeptides have a high anabolic activity but no hypoglycemic activity.

THE PRIOR ART

It is a well known fact that insulin, a proteinic hormone, produced in the pancreas, possesses remarkable physiological properties. Moreover, it displays in particular and simultaneously two types of activity: a hypoglycemic activity, and, an anabolic activity.

The hypoglycemic action has been used to advantage as a therapeutic means for the treatment of diabetes. In contrast thereto, the anabolic activity could until recently not be utilized, because the hypoglycemic effect of the insulin counterindicated its use for warm-blooded animals having a normal glycemia, as contrasted to those having hyperglycemia.

OBJECTS OF THE INVENTION

It is an object of the present invention to obtain a polypeptidic derivative of insulin which possesses an anabolic activity without a hypoglycemic activity.

Another object of the present invention is the obtention of a polypeptide derived from a material selected from the group consisting of insulin and its N-acyl derivatives, said polypeptide having the basic insulin amino-acid configuration with at least 65% of the guanidyl groups of the arginine units blocked in the form of a combination with a dicarbonyl compound, said blocking dicarbonyl derivative with said guanidyl groups being non-hydrolyzable under weak acid hydrolysis, and containing between 0 and 2.5 molecules per molecule of said polypeptide of combined dicarbonyl compound hydrolyzable under weak acid hydrolysis.

A further object of the invention is the development of a process for the obtention of a polypeptide derived from a material selected from the group consisting of insulin and its N-acyl derivatives, said polypeptide having the basic insulin amino-acid configuration with at least 65% of the guanidyl groups of the arginine units blocked in the form of a combination with a dicarbonyl compound, said blocking dicarbonyl derivative with said guanidyl groups being non-hydrolyzable under weak acid hydrolysis, and containing between 0 and 2.5 molecules per molecule of said polypeptide of combined dicarbonyl compound hydrolyzable under weak acid hydrolysis, which comprises the steps of reacting a material selected from the group consisting of insulin and its N-acyl derivatives with a dicarbonyl compound in an aqueous medium at a pH of between 7.5 and 8.5 at a temperature between about 0° C. and 25° C., adjusting the pH of said reaction to between 5 and 6 by addition of a dilute acid, and recovering said polypeptide.

These and other objects of the invention will become more apparent as the description thereof proceeds.

DESCRIPTION OF THE INVENTION

It has now been discovered that the new polypeptides of the invention, a polypeptide derived from a material selected from the group consisting of insulin and its N-acyl derivatives, said polypeptide having the basic insulin amino-acid configuration with at least 65% of the guanidyl groups of the arginine units blocked in the form of a combination with a dicarbonyl compound, said blocking dicarbonyl derivative with said guanidyl groups being non-hydrolyzable under weak acid hydrolysis, and containing between 0 and 2.5 molecules per molecule of said polypeptide of combined dicarbonyl compound hydrolyzable under weak acid hydrolysis possess physiological properties unlike those of the basic protein. They show no hypoglycemic effect while retaining an anabolic effect.

The dissociation of the two chiefly physiological activities of insulin thus realized constitutes one of the most significant characteristics in the invention.

The invention aims more specifically at the polypeptides resulting from the insulin or one of its immediate derivatives, such as the N-acyl derivatives, characterized in that the guanidyl group of the arginine peptide unit of the insulin molecule is blocked in the form of a combination with a dicarbonyl compound, such as a β-dicarbonyl compound, and further characterized in that, in addition, they contain between 0 and 2.5 molecules per molecule of insulin of the dicarbonyl compound in a combination which can be released by weak acid hydrolysis.

Dicarbonyl compounds include, in addition to a diketone or a dialdehyde, other dicarbonyl compounds, for example a ketonic ester, a diester or a ketoaldehyde. Preferably these dicarbonyl compounds contain α or β dicarbonyl groups. The following β-dicarbonyl compounds can be mentioned as examples: lower alkyl esters of acetylacetic acid, nitromalonic dialdehyde, mesoxalic dialdehyde, 1,3-cyclohexanedione, ethyl ethoxymethylene acetylacetate and acetylacetone.

It is remarkable and characteristic of the invention, that the novel polypetides, whose guanidyl groups of the arginine peptide units are blocked by acetylacetone in the form of a 2-amino-4,6-dimethylpyrimidine, show in animals no hypoglycemic activity at all, even at a dose ten times larger than that of the insulin control, but they do show an anabolic action entirely comparable to that of the insulin under the same test conditions. In this manner very active anabolic agents devoid of any secondary effects are prepared.

The new polypeptides are obtained by the action of a dicarbonyl compound, most particularly by the action of an α- or β-dicarbonyl compound on insulin or on one of its immediate derivatives such as the N-acyl derivatives.

The structure of the insulin molecule thus modified has not been definitely elucidated. However, the results of a long series of physicochemical tests show that the guanidyl group of the arginine peptide unit is combined with the dicarbonyl compound. Consequently, when the dicarbonyl compound is acetylacetone, the arginine peptide unit of insulin is believed to adopt the folowing form:

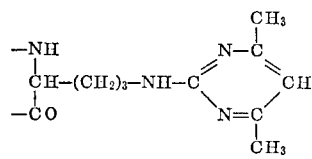

Moreover, since the analysis of the novel polypeptides indicates that several molecules of the dicarbonyl compound have in general reacted with the insulin molecule, it is supposed that certain other basic groups present in the free state in the insulin molecule may be found in the blocked state. These are believed in particular to be the $NH_2$ group of the lysine peptide units and possibly the $NH_2$ groups of the glycine and phenylalanine peptide units as well as the imidazolic NH groups of the histidine peptide units. These basic groups can react with a dicarbonyl compound, such as acetylacetone, to form an imine or an enamine.

The lysine peptide unit may then, in the case of acetylacetone, appear in the new polypeptides of the invention in the following form:

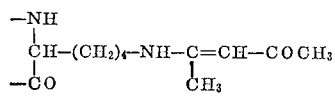

However, there exists a significant difference of stability, with reference to acids especially, between the pyrimidine resulting from the blocking of the guanidyl groups by a molecule of acetylacetone and the imine- or enamine functions, which are supposedly formed by reaction between a basic $NH_2$— or NH function and an acetylacetone molecule.

In this manner, weak acid hydrolysis of the novel polypeptides with, for example, 2N-hydrochloric acid, causes the release of the $NH_2$— or NH groups, possibly blocked by acetylacetone as an imine or enamine. On weak acid hydrolysis, acetylacetone is regenerated and determinable without the remainder of the molecule being, for all that, modified and the blockage of the guanidyl groups is not affected thereby.

Furthermore, the hydrolysis of the new polypeptides with concentrated hydrochloric acid leads to degradations of the polypeptidic units. The different amino acids, which form the polypeptide units are regenerated, except the blocked arginine, which by this treatment is converted, on the one hand, into ornithine, and on the other hand into 2-hydroxy-4,6-dimethylpyrimidine, when the blockage is effected by means of acetylacetone.

In regard to the group of the novel polypeptides, the present invention relates most particularly to those, whose percentage of the combined dicarbonyl compound, which can be released by weak acid hydrolysis, is between 0 and 2.5 molecules of dicarbonyl compound per molecule of insulin.

This releasable dicarbonyl compound is believed to originate from imines or enamines formed from the free $NH_2$— or NH groups, in particular with the $NH_2$ group of the lysine peptide units. However, it is possible that this releasable dicarbonyl compound is retained in the new polypeptides in a form different from that considered in the preceding.

Moreover, with regard to the structure of the new polypeptides the foregoing hypothesis shall in no way be deemed to limit the scope of the present invention.

A further object of the invention is the process for the preparation of the new polypeptides.

The said process is characterized in that the insulin or one of its immediate derivatives such as N-acyl derivatives is reacted in aqueous medium with a dicarbonyl compound such as a $\beta$-dicarbonyl compound. The reaction is effected at a pH-value of between 7.5 and 8.5, and at a temperature between 0° C. and 25° C. Thereafter, the reaction mixture is adjusted to a pH-value between 5 and 6 by adding slightly acid water, and the new polypeptide is isolated carrying an amount of at least 65% of the guanidyl groups of the arginine peptide units blocked in the form of a combination with the dicarbonyl compound employed, which blocked guanidyl groups are not hydrolyzable under weak acid hydrolysis. In addition the new polypeptide has between 0 and 2.5 molecules per molecule of insulin of combined dicarbonyl compound releasable by weak acid hydrolysis.

The accomplishment of the process of the invention may be further characterized by the following:

(a) The condensation reaction between insulin or its derivatives and the dicarbonyl compound is carried out in an aqueous or hydro-alcoholic media in the presence of an alkaline bicarbonate such as an alkali metal or ammonium bicarbonate, or in a buffered solution based on a phosphate or a borate, such as an alkali metal or ammonium phosphate or borate.

(b) The condensation reaction is conducted in an aqueous medium in the presence of another organic solvent soluble in water, such as dimethylformamide, acetone, dimethylsulfoxide and mono- and polyhydroxylated solvents, for example water-soluble lower alkanols and water-soluble glycols.

(c) The dicarbonyl compound is acetylacetone, which is utilized in a large excess and the reaction is carried out at a temperature between 20° and 25° C., at a pH of about 8.

It should be noted here, that the progressive or entire disappearance of the guanidyl group of the arginine peptide unit of insulin can be followed by various methods. For example, the colored reaction described by Sakagushi, (Dumazert and Poffi, Bull. Ste. Chim. Biol. 21 (1939), 1380) as specific of the free guanidyl group in arginine compounds allows one to determine, qualitatively and quantitatively, the guanidyl group in the new polypeptides and to determine the instant when the reaction is completed.

The determination of the hypoglycemic and anabolic activities of the new polypeptides, carried out comparatively with that of the activities of insulin, also allows the determination of the effectivness of the reaction of the dicarbonylated derivative.

The hypoglycemic effect is measured in the usual manner on rabbits by the reduction of the amount of glycemia, brought on by an injection of the product to be tested. For example, insulin at a dose of 0.5 I.U./kg. causes a reduction of 40%.

With regard to the anabolic effect, this can be measured by the speed of in vivo incorporation of $C_{14}$ glycine in the diaphragmatic proteins of the mouse. Under the operative conditions of this test, insulin at a dose of 5 I.U./kg. causes an increase of 50% in the speed of incorporation.

Without question, these tests can be applied in analogous fashion in all of those cases where the selected dicarbonyl reactant reacts with the guanidyl group of the arginine peptide units of insulin to form a definite compound.

The following examples will give a better comprehension of the invention. However, it is to be understood, that they do not limit the scope of the invention in any manner.

Example I

To a clear solution of 0.5 gm. of insulin in 40 cc. of a 7% solution of potassium bicarbonate in water, 5 cc. of acetylacetone were added under agitation. The agitation of the reaction mixture was continued for six days at room temperature (about 20° C.). The precipitate formed was separated by centrifuging, washed first with slightly acid water (pH-value=5.5 to 6), then with acetone and dried. The yield amounted to about 87% of polypeptide of which 65% of the guanidyl groups of the arginine peptide units were blocked in the form of 2-amino-4,6-dimethylpyrimidine. This new polypeptide occurred in the form of an amorphous, white powder, soluble in slightly alkaline solutions such as 0.1 N ammonia water, and insoluble in dilute aqueous acids and in the usual organic solvents.

Analysis. — $C_{264}H_{387}O_{76}N_{65}S_6$; molecular weight= 5,879.64. Calculated: C, 53.90%; H, 6.64%; N, 15.48%. Found: C, 54.1%; H, 6.5%; N, 15.5%.

Ultra-Violet spectra: In 0.01 N ammonia inflection at 280 m$\mu$ _____ $E^{1\%}_{1cm.}=20$ $\lambda$max. at 288 m$\mu$ _____ $E^{1\%}_{1cm.}=23$ $\lambda$max. at 305 m$\mu$ _____ $E^{1\%}_{1cm.}=27$ In 0.1 N hydrochloric acid $\lambda$ max. at 276 m$\mu$
Inflection to 281 m$\mu$
$\lambda$ max. at 308 m$\mu$ The total acid hydrolysis of the product obtained was accomplished with the aid of 6 N hydrochloric acid, by heating to 110° C. for 24 hours. After elimination of the hydrochloric acid, the hydrolysate was subjected to a bi-dimensional chromatography under the following conditions:

1st direction.—Acid solvent composed of a n-butanol/ acetic acid/water at a ratio of 4:1:5.

2nd direction.—Basic solvent composed of collidine/ water at a ratio of 1:1.

Developing agent.—Ninhydrine/collidine.

This chromatogram, compared with that originating from the hydrolysis of insulin, showed several important characteristics, namely: presence of a slight arginine stain; presence of a stain corresponding to the group lysine-ornithine approximately doubled in comparison with that of the insulin control and slightly less displaced in the horizontal direction; and presence of a yellow stain corresponding to 2-hydroxy-4,6-dimethylpyrimidine.

The weak acid hydrolysis of the polypeptide obtained was effected with the aid of 2 N-hydrochloric acid by heating in a water-bath for 10 minutes. After the hydrochloric acid had been neutralized, the new derivative of insulin thus formed could be isolated and also the acetylacetone liberated could be condensed with ortho-phenylenediamine. This last reaction allows a colorimetric determination of the acetylacetone and indicates the release of about one molecule of acetylacetone per molecule of polypeptide.

Example II 0.85 gm. of insulin and 3.5 gm. of potassium bicarbonate were dissolved in 37.5 cc. of water. Next, 37 cc. of 95% ethanol and 8 cc. of acetylacetone were added. The solution was maintained at a temperature of 20°–25° C. over a period of 28 days. Thereafter, the solution was slightly acidified to a pH-value of 5.6–5.8 by means of an aqueous 1 N hydrochloric acid solution. The precipitate formed was centrifuged, washed first with water, then with acetone and dried. In this manner, 0.65 gm. of polypeptide (yield=77%) were obtained of which 95% of the guanidyl groups of the arginine peptide units were blocked in the form of 2-amino-4,6-dimethylpyrimidine.

The weak acid hydrolysis, effected as described in Example I, led to the release of about one molecule of acetylacetone per molecule of polypeptide.

Example III

The work is carried out in exactly the same manner as described in Example II, but with the difference that a solution of 0.5 gm. of insulin, 1.5 gm. of potassium bicarbonate, 25 cc. of water, 15 cc. of 95% ethanol and 10 cc. of acetylacetone were used, and the reaction was conducted for 19 days. 415 mg. of polypeptide were obtained (that is a yield of 83%), of which 97.2% of the guanidyl groups of the arginine peptide units were blocked in the form of 2-amino-4,6-dimethylpyrimidine.

The weak acid hydrolysis, conducted as described in Example I led to the release of about 0.6 molecule of acetylacetone per molecule of polypeptide.

The preceding specific embodiments are illustrative of the invention. It is to be understood, however, that they are not limitative in any manner and other expedients known to those skilled in the art or described herein may be employed.

We claim:

1. A mixture of polypeptides having the same sequence of amino-acids as insulin, said mixture containing at least 65% of polypeptides having the guanidyl group of the arginine unit blocked in the form of a combination with a dicarbonyl compound, produced by the process which consists essentially of the steps of reacting insulin with acetylacetone, adjusting the pH of said reaction to between 5 and 6 by addition of a dilute acid, and recovering said polypeptide mixture.

2. The polypeptide of claim 1 wherein substantially all of the guanidyl groups of the arginine units are blocked.

References Cited

UNITED STATES PATENTS 3,288,793  11/1966  Priewe et al. _____ 260—256.5

OTHER REFERENCES

Cyanimid's Nitrogen Chemicals Digest, vol. IV, American Cyanimid Co., New York, 1950, pp. 21–23, TP/248/ G8/A5.

Karrer, Organic Chemistry, third English edition, Elsevier Publishing Co., New York, 1947, pp. 797–799.

Schroeder et al., The Peptides, vol. II, Academic Press, New York, 1966, pp. 376–379, QD/431/S47.

Fieser et al., Topics in Organic Chemistry, Reinhold Publishing Co., New York, 1963, p. 261, QD/251/F5t.

LEWIS GOTTS, Primary Examiner

MELVIN M. KASSENOFF, Assistant Examiner

U.S. Cl. X.R.

424—178

PO-1050
(5/69)

UNITED STATES PATENT OFFICE
CERTIFICATE OF CORRECTION

Patent No. 3,471,464          Dated October 7, 1969

Inventor(s) Paul Bellet, Truong van Thuong and Gerard Nomine

It is certified that error appears in the above-identified patent and that said Letters Patent are hereby corrected as shown below:

IN THE PATENT, Column 6, line 36 (Claim 1, line 7);

IN THE APPLICATION, Claim 14, lines 10 to 16 as the claim appears in the amendment filed February 12, 1969, after the word "acetylacetone" the following clause has been omitted:

-- in a medium selected from an aqueous medium and a hydroalcoholic medium at a pH of between 7.5 and 8.5 at a temperature between about 0°C and 25°C, for a time sufficient to obtain said mixture of polypeptides containing at least 65% of polypeptides having the guanidyl group of the arginine unit blocked in the form of a combination with said --.

SIGNED AND
SEALED
JUL 28 1970

(SEAL)
Attest:

Edward M. Fletcher, Jr.
Attesting Officer

WILLIAM E. SCHUYLER, JR.
Commissioner of Patents